(12) United States Patent
Galford

(10) Patent No.: US 11,340,378 B2
(45) Date of Patent: May 24, 2022

(54) AZIMUTHAL BOREHOLE RENDERING OF RADIOELEMENT SPECTRAL GAMMA DATA

(71) Applicant: Halliburton Energy Services, Inc., Houston, TX (US)

(72) Inventor: James E. Galford, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 409 days.

(21) Appl. No.: 16/613,925

(22) PCT Filed: Jan. 14, 2019

(86) PCT No.: PCT/US2019/013519
§ 371 (c)(1),
(2) Date: Nov. 15, 2019

(87) PCT Pub. No.: WO2020/149824
PCT Pub. Date: Jul. 23, 2020

(65) Prior Publication Data
US 2021/0363874 A1    Nov. 25, 2021

(51) Int. Cl.
*G01V 5/04*     (2006.01)
*G01V 5/06*     (2006.01)
(Continued)

(52) U.S. Cl.
CPC .............. *G01V 5/06* (2013.01); *E21B 7/04* (2013.01); *G01V 5/045* (2013.01); *E21B 47/0025* (2020.05); *E21B 47/024* (2013.01)

(58) Field of Classification Search
CPC .. G01V 5/06; G01V 5/045; E21B 7/04; E21B 47/0025; E21B 47/024; E21B 47/111; E21B 47/022
See application file for complete search history.

(56) References Cited

U.S. PATENT DOCUMENTS

| 7,880,134 B2 | 2/2011 | Kirkwood et al. |
| 2005/0140373 A1 | 6/2005 | Li et al. |

(Continued)

OTHER PUBLICATIONS

PCT Application Serial No. PCT/US2019/013519, International Search Report, dated Oct. 11, 2019, 4 pages.
(Continued)

*Primary Examiner* — Kiho Kim
(74) *Attorney, Agent, or Firm* — Delizio, Peacock, Lewin & Guerra

(57) ABSTRACT

Embodiment disclosed herein include systems and methods for azimuthally imaging a borehole, A logging tool having one or more gamma radiation sensors is disposed at a depth position within a borehole, with the one or more gamma radiation sensors positioned to measure gamma radiation within multiple azimuthally offset sectors. The gamma radiation sensors measure gamma radiation at one or more positions within each of the azimuthally offset sectors. A spectral gamma radiation profile is determined for three radioelements at the one or more positions within each of the azimuthally offset sectors based on the gamma radiation measurements. Concentrations of each of the radioelements are determined at the one or more positions based, at least in part, on the spectral gamma radiation profiles, A plurality of color coded points that each encode the combined concentrations of one or more of the radioelements are generated by mapping each of the determined concentrations to an axis point on each of three color coded axes that define a three dimensional display space. The color coded points are rendered in an azimuthal radioelement borehole image.

20 Claims, 7 Drawing Sheets

(51) Int. Cl.
*E21B 7/04* (2006.01)
*E21B 47/002* (2012.01)
*E21B 47/024* (2006.01)

(56) References Cited

U.S. PATENT DOCUMENTS

| | | |
|---|---|---|
| 2009/0319243 A1 | 12/2009 | Suarez-Rivera et al. |
| 2010/0076738 A1 | 3/2010 | Dean et al. |
| 2012/0112087 A1* | 5/2012 | Yokoi .................. G01T 1/2907 250/394 |
| 2012/0217008 A1 | 8/2012 | Moos et al. |
| 2013/0282289 A1 | 10/2013 | Lotfy et al. |
| 2018/0059283 A1 | 3/2018 | Xu et al. |
| 2018/0172608 A1 | 6/2018 | Wu et al. |
| 2018/0267199 A1 | 9/2018 | Xu et al. |

OTHER PUBLICATIONS

PCT Application Serial No. PCT/US2019/013519, International Written Opinion, dated Oct. 11, 2019, 4 pages.
Briggs, "Color Display of Well Logs", Mathematical Geology, vol. 17, No. 4, 1985, p. 481.
Collins, et al., "Application of Color Information Theory to the Display of Lithologic Images from Wireline Logs", Paper II presented at the 29th SPWLA Annual Logging Symposium, Jun. 5-8, 1988, 15 pages.
Hall, "Composite Colour Display of Spectral Gamma-Ray Logs", Insite Canadian Well Logging Society Magazine, vol. 20, No. 4, Dec. 2005, pp. 21-24.
Sullivan, et al., "Briggs Colour Cubing of Spectral Gamma Ray—A Novel Technique for Easier Stratigraphic Correlation and Rock Typing", paper U presented at the 58th SPWLA Annual Logging Symposium, Jun. 17-21, 2017, Oklahoma City, OK, 10 pages.

\* cited by examiner

US 11,340,378 B2

AZIMUTHAL BOREHOLE RENDERING OF RADIOELEMENT SPECTRAL GAMMA DATA

TECHNICAL FIELD

The disclosure generally relates to the field of spectral elemental display and more particularly to downhole azimuthal display of spectral gamma radioelement data.

BACKGROUND ART

Borehole imaging is utilized for producing display images of the formation rock and other material that make up a borehole wall. The images are visually encoded in some manner to convey the material composition and/or petrophysical structure of the borehole wall materials and/or material proximate the borehole wall. Borehole imaging systems may utilize one or more data input types such as acoustic response, electromagnetic response, as well as induced and naturally occurring gamma radiation responses to determine and display encoded borehole material elemental composition information.

Borehole imaging may be utilized as an input for directional drilling to optimize the positioning of wellbores within target hydrocarbon formations. The encoded imaging information is utilized to guide the directional drilling of boreholes such as for determining the direction of drilling during or following downhole logging operations. Borehole imaging information, such as that using natural or induced gamma response information, may be limited in terms of downhole-to-surface bandwidth limitations as well as providing optimally useful borehole image rendering. Such transmission and rendering limitations present issues for real-time applications such as directional drilling during or following downhole logging operations.

BRIEF DESCRIPTION OF THE DRAWINGS

Embodiments of the disclosure may be better understood by referencing the accompanying drawings.

DESCRIPTION OF EMBODIMENTS

Figure 1A:
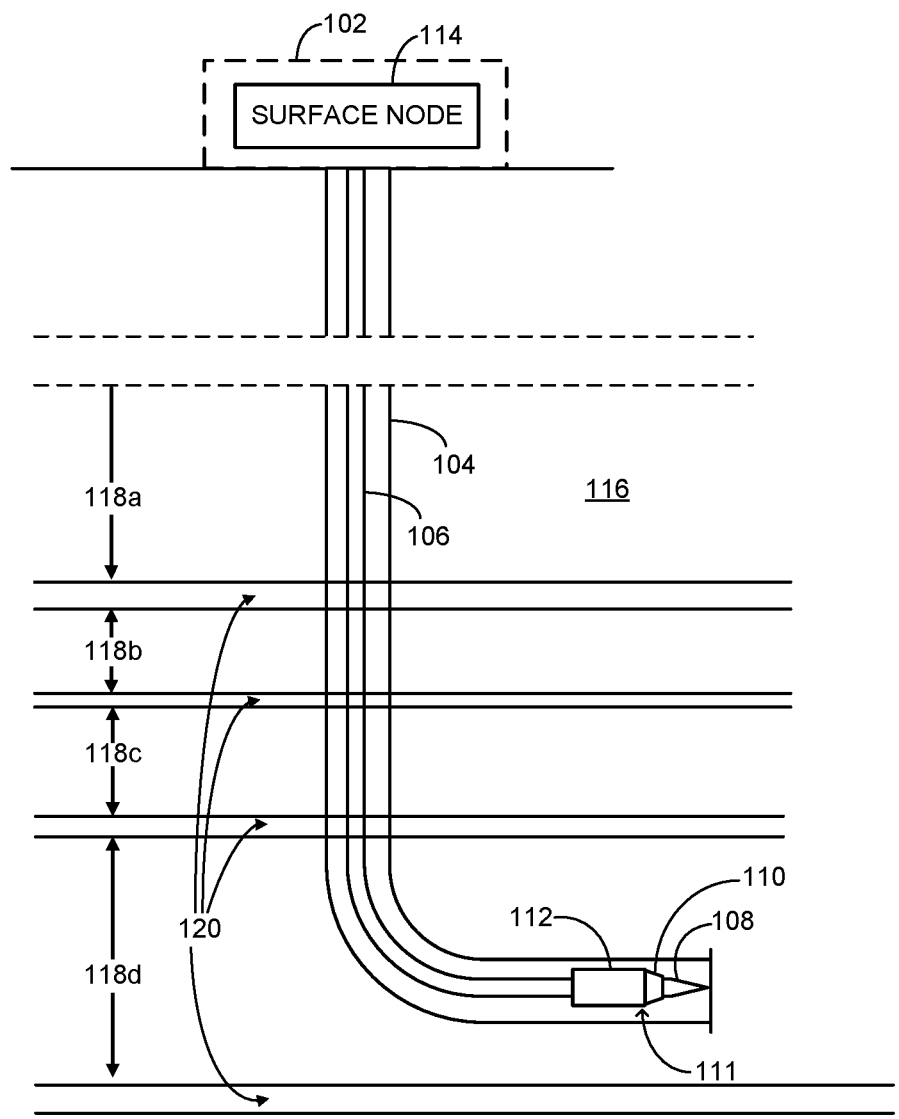
FIG. 1A is a block diagram depicting a borehole azimuthal imaging system configured and implemented within a borehole drilling system during logging while drilling (LWD) operations in accordance with some embodiments.

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

Overview

Disclosed embodiments include systems, devices, components, and operations for mapping downhole gamma radiation information into a three-dimensional display space that conveys the relative gamma spectral contributions of three distinct radioelements. A radioelement is an element having isotopes most or all of which are radioactive and are therefore referred to as radioisotopes. Gamma radiation logging is generally utilized to determine naturally occurring gamma radiation to characterize the formation material within a borehole. Gamma radiation logging may be implemented by wireline (WL) and/or logging while drilling (LWD) logging methods such as may be implemented to evaluate underground hydrocarbon or mineral formations.

In some embodiments, a spectral gamma tool having one or more gamma radiation sensors is positioned at a number of measurement depths within a borehole. At each of the measurement depths, the spectral gamma tool measures gamma radiation across multiple azimuthal sectors to provide comprehensive borehole azimuthal measurement coverage. The spectral gamma tool may be configured to measure naturally occurring or induced gamma responses at one or more azimuthally distinct points within each of the azimuthally offset sectors. The gamma radiation measurements include spectral components corresponding to three radioelements such as one or more radioisotopes of Thorium, Uranium, and Potassium. Like spectral components are combined to form spectral gamma radiation profiles for each of the three radioelements and/or three radioisotopes of the three radioelements. As utilized herein "radioelement" is used interchangeably to refer to either all or a subset of one or more of the radioisotopes of a given radioelement.

In some embodiments, the logging tool is configured to include spectral analysis components that determine, based on the spectral profile results, the amounts and/or concentrations of the radioelements at each of the azimuthally offset measurement positions. The logging tool is further configured to include imaging processing components that generate a set of color coded points each corresponding to one of the azimuthally offset measurement positions. Each of the color coded points encodes the combined concentrations of the radioelements for the azimuthally offset sectors and measurement positions within the sectors. The radioelement concentrations are encoded in each color coded point by mapping each of the determined radioelement concentrations at each measurement point to a point on each of three color coded axes that define a three dimensional display space. The logging tool generates the color coded points in the form of triaxial triplets that may be transmitted in real time to a drilling rig steering system that includes components for rendering and otherwise processing the color coded point in conjunction with lithographic formation data to direct drilling steering operations during or following the logging operations.

Example Illustrations

FIG. 1A is a block diagram depicting a borehole azimuthal imaging system configured and implemented within a downhole logging system in accordance with some embodiments. The imaging system may be deployed in various downhole measurement configurations such as a logging while drilling (LWD) or a wireline configuration. For the embodiment depicted in FIG. 1A, the imaging system is included in a borehole drilling system configured to perform LWD operations that may or may not be utilized for real-time geosteering. The imaging system includes a surface processing system 114 incorporated in part or in whole within the computing and communication equipment of a well head apparatus 102. Well head apparatus 102 includes mechanical and electronic systems, subsystems, devices, and components for operating a downhole logging tool and/or operating a drilling rig including a drill string 106 for drilling a borehole 104 into a formation 116, which may be a hydrocarbon or other type of formation such as a mineral formation. As depicted and described in further detail with reference to FIG. 1B in conjunction with FIG. 1A, surface processing system 114 includes processing, storage, and input/output components configured to receive, store, display, and otherwise process borehole azimuthal material properties information. The system components include a communication hub 144 configured to route signal transmissions between surface processing system 114 and measurement processing components within the downhole tool, e.g. a bottom hole assembly (BHA) at the terminal end of drill string 106.

The depicted BHA includes a drill bit 108 that is structured to penetrate into portions of formation 116. The BHA further includes electromechanical components not expressly depicted in FIG. 1A that are configured to control the three-dimensional direction of drill bit 108. The BHA includes additional drilling components such as a drill motor, one or more drill collars, and stabilizers that are not expressly depicted in FIG. 1A. Disposed behind drill bit 108 within the BHA is formation measurement and logging equipment in the form of a logging tool 111 that may be deployed with the BHA during LWD operations as shown in the depicted embodiment. The depicted logging tool 111 includes a gamma radiation logging sonde 110 comprising one or more gamma radiation sensors and an electronics assembly 112 comprising power supply and logging support electronics components. Although shown as part of a BHA in FIG. 1A, the logging tool 111 with its components can be part of a downhole logging tool conveyed by various other conveyance types, e.g. wireline (further described below), slickline, coiled tubing, downhole tractor, other tubing, etc.

During drilling operations, information such as from logging tool 111 is processed by surface node 114 to determine and modify the drilling direction of drill bit 108 within formation 116. For instance, surface node 114 may comprise processing components configured to derive formation material properties from raw and/or pre-processed acoustic, optical, electromagnetic, and/or ionizing radiation measurements collected by logging tool 111 depending on the sensor configuration of logging tool 111. As depicted, formation 116 comprises multiple distinct, interleaved formation material layers including multiple sand and/or sandstone layers 118a, 118b, 118c, and 118d that are interleaved by multiple shale laminate layers 120. Identifying and navigating among and through the shale and sand layers is important in terms of optimizing the lengthwise position of the production or injection wells that are effectively created during the drilling process. The drilling direction/steering control system includes components for interpreting the formation properties such as material composition and lithography of the sand layers 118a-118d and shale layers 120 to optimize the positioning of subsequent production or injection well strings within formation 116.

To determine formation composition (i.e., constituent elemental components) and/or structural properties, logging tool 111 may be configured on one or more operation cycles to measure various types of naturally occurring and/or induced signals. Such response signals may include acoustic, optical, electromagnetic, and ionizing radiation from which formation properties are derived and used as a drilling direction control input. Formation borne radioelements such as thorium, uranium, and potassium, provide useful information in determining the lithographical information utilized to optimize drilling direction. In the depicted embodiment, logging tool 111 includes one or more gamma radiation sensors within logging sonde 110 configured to measure naturally occurring gamma radiation emitted from formation materials, particularly radioelements that are present at various amounts and concentrations. Such radioelements typically includes various isotopes of thorium, uranium, and potassium.

Figure 1B:
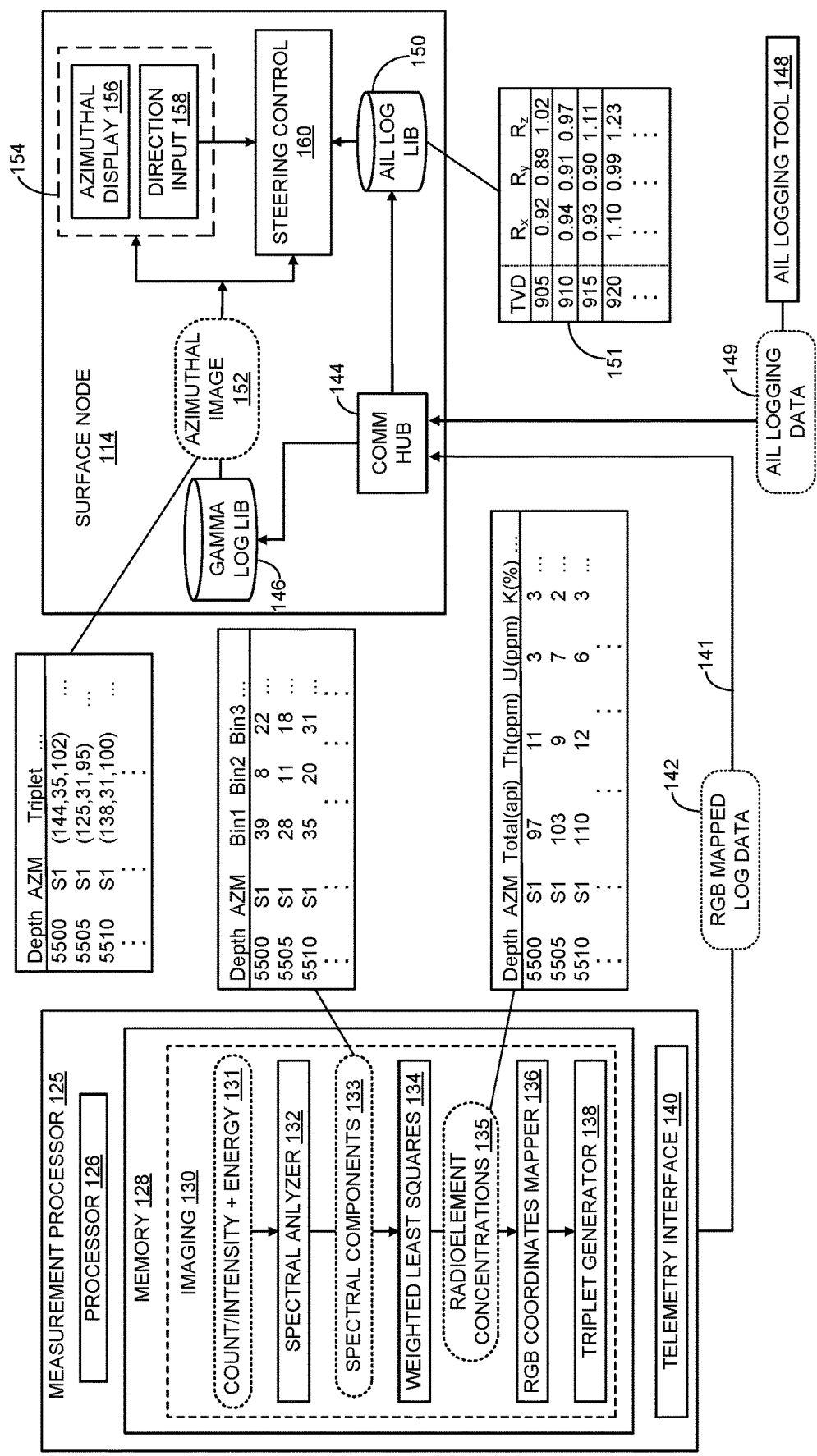
FIG. 1B is a block diagram depicting azimuthal imaging subsystems, devices, and components implemented by a downhole logging tool and a surface display system that are included in the borehole azimuthal imaging system shown in FIG. 1A.

As logging tool 111 progresses during drilling or via wireline or other logging conveyance means within formation 116, logging sonde 110 is positioned at different positions and at various depths within borehole 104 while communicatively coupled to surface processing system 114 via a wireless or wired telemetry link, depicted in FIG. 1B as telemetry link 141.

Telemetry link 141 may be configured to carry a variety of communication modes (e.g., modulation types) using one or more different transmission media such as electromagnetic, acoustic, and optical fiber media. The gamma radiation sensors 110 within logging sonde 110 may be configured to measure the number and energy intensity of gamma rays. The gamma radiation sensors may be positioned and/or azimuthally rotated to capture gamma radiation measurements from the inner circumferential perimeter of a given point with borehole 104.

In some embodiments, logging sonde 111 is a spectral logging tool configured to measure the spectrum, in terms of the number and energy, of gamma rays emitted via natural radioactivity of formation 116. For example, gamma sensors 110 may comprise scintillometer devices configured to measure the number and energy intensity of the naturally occurring gamma rays. During a measurement cycle, individual gamma rays of the overall gamma radiation strike a measurement medium such as a scintillation crystal and may or may not be absorbed. In response to absorption of a gamma ray, the crystal generates a light energy flash. The light flash may be detected by a photomultiplier that converts the light flash into an electrical pulse that is counted by the sensor portion of the logging tool.

When configured as a spectral logging tool, logging tool 111 further includes an electronics assembly 112 that includes electronics and processing components configured to process the gamma ray counts and corresponding energy levels measured by gamma sensors within logging sonde 110. FIG. 1B illustrates azimuthal imaging subsystems, devices, and components implemented by a downhole logging tool such as by the electronics assembly unit 112 of logging tool 111. As shown in FIG. 1B, a measurement processor 125 may be included as part of the electronics assembly 112 of logging tool 111. Measurement processor 125 comprises a combination of hardware electronics and logic components as well as software or hardware-encoded program instructions for generating azimuthal borehole imaging data mapped into a three-dimensional, color coded imaging space.

The hardware within measurement processor 125 incudes a microprocessor 126 configured to execute instructions corresponding to program instructions loaded into an associated computer memory 128. The software stored or retrieved by or otherwise accessible for loading into memory 128 includes an imaging application program 130 that includes a combination of program instructions for processing gamma sensor data to generate azimuthal borehole images. In the depicted embodiment, measurement processor 125 retrieves gamma measurement data in the form of counts (numbers and/or count rates) and energy levels from the gamma radiation measurements. Imaging program 130 includes a spectral analyzer component 132 that receives and processes the count and energy level information to generate spectral component data 133.

Figure 2:
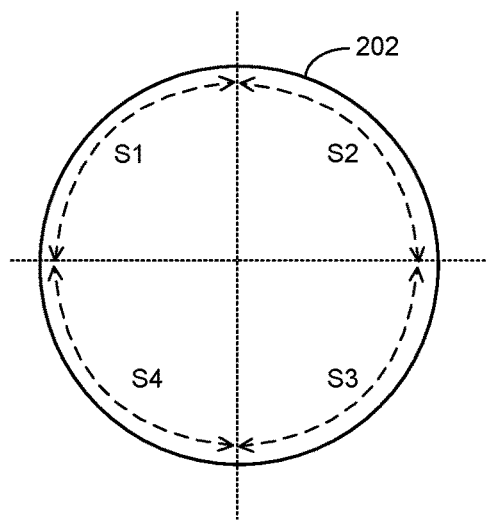
FIG. 2 depicts azimuthal sectoring of gamma ray spectral information along a conceptually represented perimeter of a borehole in accordance with some embodiments.

Spectral component data 133 may be constructed in multiple records that each associate a measurement depth with gamma radiation measurements collected at each of the different azimuth measurement positions. As described with reference to the gamma sensors within logging sonde 110 in FIG. 1A, gamma ray measurements are performed at multiple, azimuthally offset positions at each measurement depth. FIG. 2 depicts azimuthal sectoring of gamma ray spectral information along a conceptually represented perimeter 202 of a borehole in accordance with some embodiments. As shown, the gamma ray measurements and consequent spectral components data 133 may be collected and recorded within sectors S1-S4 that divide the circumferential perimeter 202. The depicted spectral component data 133 comprises records that each associate a respective measurement depth (e.g., 5505 feet) and a respective measurement sector (e.g., sector S1) with energy-binned count values that constitute the element-specific spectral aspects, or spectral gamma radiation profile, of the measurements.

As depicted in FIG. 1A, the formation within which the gamma measurements are performed and processed may include formation layers that includes rock and sediment materials such as sand and shale that include signature levels of the radioelements thorium, uranium, and potassium. The binning entries in each of the row-wise records in spectral component data 133 constitute response numbers/counts of gamma rays having a characteristic energy value or falling within a range of energy values. For instance, the depicted Bin1, Bin2, Bin3, may represent gamma counts associated with energy level ranges (e.g., ranges in MeV).

Imaging program 130 further includes a weighted least squares processing component 134 that receives and processes the spectral components data 133 to determine concentrations of radioisotopes of such as thorium (e.g., $Th^{232}$), uranium (e.g., $U^{238}$), and potassium (e.g., $K^{40}$). Different radioisotopes and corresponding radioactive emission byproduct isotopes, referred to as daughters, emit gamma rays that have characteristic energy levels such as may be measured in MeV. Least squares component 134 is configured to apply a least squares algorithm that applies the patterns of characteristic gamma ray energy thresholds of the radioelements that can be mapped to the energy-binned values within spectral component data 133. For instance, the gamma energy thresholds, also referred to as gamma lines, for potassium, thorium, and uranium isotopes are 1.46 MeV, 2.61 MeV, and 1.76 MeV, respectively.

From the least squares computations, least squares component 134 generates radioelement concentration data 135 that indicate respective concentrations of thorium, uranium, and potassium corresponding to measurements performed at each of the measurement depths.

Radioelement concentration data 135 includes records that each associate a respective measurement depth with an azimuthal measurement position, a total gamma radiation measurement value in American Petroleum Institute (API) units (e.g., 103 API), and concentration values for each of the radioelements within the azimuthal measurement position. For example, the second row-wise record within radioelement concentration data 135 associates the gamma radiation measurement depth of 5505 feet with a total measured gamma ray measurement of 103 API units. The record further associates the measurement depth and total gamma radiation measurement with concentrations of thorium and uranium specified in units of parts per million (ppm) and a concentration of potassium in fractional/percent units. In some embodiments, the total gamma measurement values may be calculated from the concentrations of the radioelements that are estimated via least squares fitting from the measured spectral information.

Figure 3:
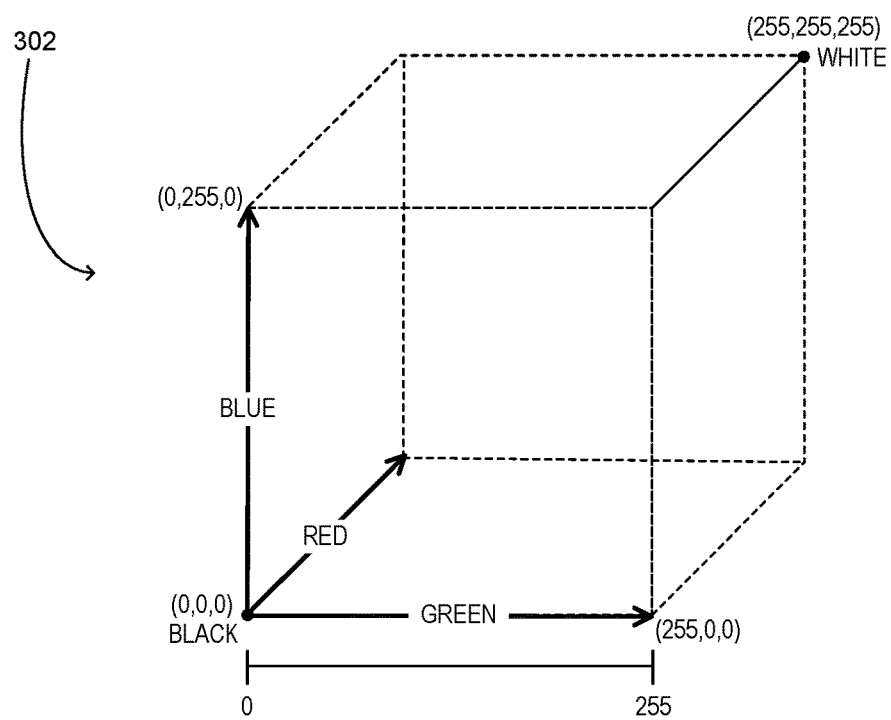
FIG. 3 illustrates a three-dimensional RGB cube space into which gamma ray spectral measurements are mapped as points representing RGB triplets in accordance with some embodiments.

Imaging program 130 further includes a coordinates mapper component 136 that is configured using program code to map the determined radioelement concentrations into one of three imaging/display space dimensions. For example, coordinates mapper 136 may apply the triaxial red, green, and blue dimensions that may be quantified as respective axes having respective length and scale and which together define a form of RGB display space such as a Briggs color cube. An example RGB three-dimensional color display space is shown in FIG. 3, which illustrates a three-dimensional RGB cube space 302 into which gamma ray spectral measurements are mapped as points representing RGB triplets that correspond to combined radioelement concentrations in accordance with some embodiments.

As depicted, RGB cube space 302 comprises three mutually orthogonal axes, originating at a point in three-dimensional color-coded space representing black. The axes respectively represent intensities of red, green, and blue as each axis extends outward to a final unit value of 255 for a total of 256 points on each axis. Referring to FIG. 1B in conjunction with FIG. 3, coordinates mapper 136 may be configured to determine a single value along each of the red, green, and blue axes that correspond to the relative concentrations of potassium, thorium, and uranium, respectively. Coordinates mapper 136 may be configured to normalize units used for radioelement concentrations to the scale of the RGB imaging space being applied. For example, coordinates mapper 136 may be configured to determine the relative concentrations of each of the thorium, uranium, and potassium radioelements in terms of the fractional relation between respective ppm values for thorium and uranium and a percentage of potassium. For example, a baseline combination of relative concentrations may be used to normalize the respective radioelement concentration for each axis. For example, each set of radioelement concentrations (e.g., 9 ppm, 7 ppm, and 2% at depth 5505) may be first normalized based on a specified baseline combination and then each normalized concentration value applied to a corresponding point on a respective one of the axes. The baseline combinations may comprise ppm values for thorium and uranium and a percentage value for potassium determined for a particular geographic region and/or true vertical depth of measurement.

Imaging program 130 further includes a triplet generator 138 that is configured to combine the three individual axis points corresponding to a single measurement point at a given depth and azimuthal position into a triplet. Triplet generator 138 receives and processes sets of three individual axis points mapped by coordinates mapper 136 for each set of derived concentrations of the radioelements. Triplet generator 138 combines the information encoded within each of the individual color coded points into a single triplet coordinate value that is associated with the corresponding measurement depth and azimuthal positions and transmitted as RGB mapped log data 142 via telemetry link 141 to a communication hub 144 within surface processing system 114.

The RGB mapped log data 142 may be recorded in a spectral gamma logging library 146 as an azimuthal image data stream 152 that may be recorded in a file system or object based storage format. The content of azimuthal image data stream 152 includes a serialized sequential of measurement points corresponding to each of the encoded triplet coordinate points associated with a measurement depth and an azimuthal position. For instance, the third ow-wise entry in azimuthal image data stream 152 specifies a measurement depth of 5510 depth units associated with an azimuthal position of sector 1 (S1) and a color-coded imaging space coordinate of (138, 31, 100). Referring to FIG. 3 in conjunction with FIG. 1B, the (138, 31, 100) triplet corresponds to a red scale/axis value of 138 on a scale of 256, a green scale/axis value of 31, and a blue scale/axis value of 100, with red, green, and blue corresponding to the normalized gamma spectral measurements for thorium, potassium, and uranium, respectively.

The azimuthal image data stream 152 may be transmitted as a streamed file from gamma logging library 146 and received and stream-processed by an azimuthal borehole imager 154. In other embodiments, azimuthal image data stream 152 may be transmitted in substantially real-time directly from communication hub 144 to azimuthal borehole imager 154. Azimuthal borehole imager 154 comprises any combination of hardware and software components and program instructions for rendering the triplet-encoded multi-radioelement information encoded within azimuthal image data stream 152. In the depicted embodiment, azimuthal borehole imager 154 comprises an azimuthal display system 156 that is configured using any combination of computer display hardware and program logic to render a displayed image of the color-coded azimuthal borehole image on a display devices.

Figure 4:
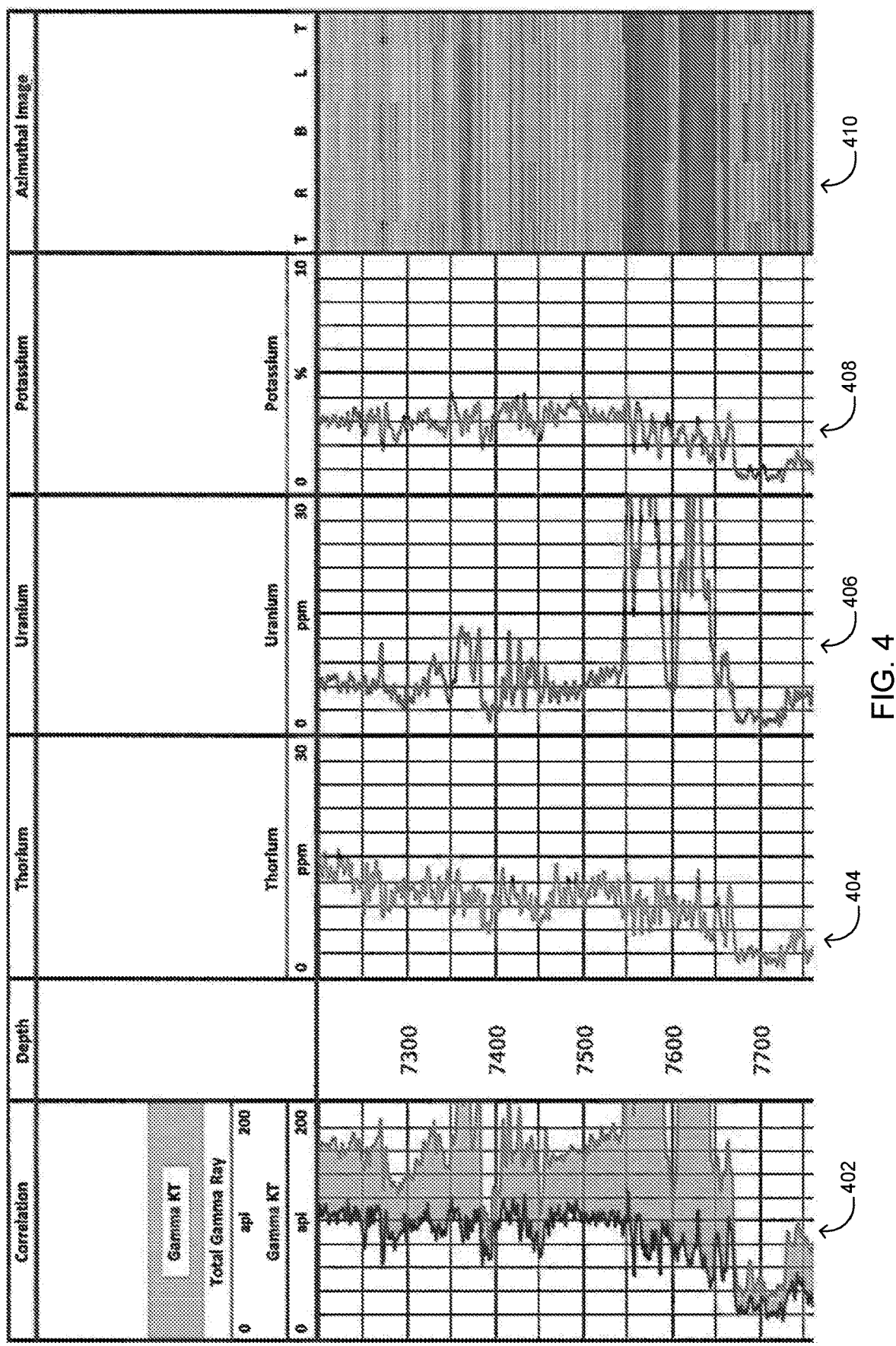
FIG. 4 illustrates an example portion of an azimuthal borehole image aligned with corresponding total gamma ray spectral information and corresponding radioelement concentration data that is processed to generate the image.

FIG. 4 illustrates an example portion of an azimuthal borehole image 410 aligned with corresponding total gamma and gamma ray spectral information that is processed to generate the image 410. As shown, the relative contributions of a total gamma ray measurement 402 are converted to a depth-varying thorium concentration 404, a depth-varying uranium concentration 406, and a depth-varying potassium concentration 408. Azimuthal borehole image 410 is binned into four quadrants, top (T), right (R), bottom (B), and left (L) into which the contributions from each of concentrations 404, 406, and 408 are accumulated during logging by periodically processing the total gamma spectra to extract the relative radioelement contributions. The relative, radio-element-specific concentration contributions are converted into a RGB triplet for each bin and the RGB triplets from two or more of the azimuthal bins are combined to generate a real-time or post-acquisition image similar to azimuthal borehole image 410.

With reference to FIG. 1B, the azimuthal borehole imager 154 may further include a direction input component 158 that may receive inputs from a user interface such as pointer device or keyboard in association with the information rendered by azimuthal display 156. In addition or alternatively, the direction input 158 may be a program component that reads the imaging information within azimuthal image data stream 152 and translates the azimuthal borehole information into one or more direction instructions received and processed by a drill steering control system 160. Steering control system 160 is configured using any combination of electromechanical components, including downhole components, and computer processing components to set and modify the direction in which the drill bit is steered during formation drilling based on the input from azimuthal borehole imager 154.

In some embodiments, non-gamma formation properties information may be used in combination with the color-coded azimuthal borehole imaging data to generating drilling steering instructions. For instance, in addition to the RGB mapped log data 142, communications hub 144 may concurrently or alternately receive other formation material and/or structural properties information obtained from non-gamma measurement sources. For example, an array induction logging tool 148 may generate and transmit formation resistivity information and/or formation properties derived from the resistivity measurements as induction logging data 149 to communication hub 144 from which it may be transmitted to and recorded in an induction logging library 150. Induction logging data 149 may comprise raw resistivity data that is further processed by one or more formation resistivity modeling tools (not expressly depicted) within surface node 114 to determine formation material and structural properties. As shown, induction logging library 150 includes records 151 that each associate a true vertical depth (TVD) value with a set of triaxially measured resistivities Rx, Ry, and Rz. For example, the second row-wise record associates a TVD of 910 depth units (e.g., feet) with a triaxial resistivity measurement having a components Rx=0.94, Ry=0.91, and Rz=0.97 resistance units (e.g., ohms-m). During LWD operations, steering control system determines steering settings and modifications based on the records 151 and/or formation properties determined from records 151 in combination with the streamed azimuthal image data stream 152.

Figure 5:
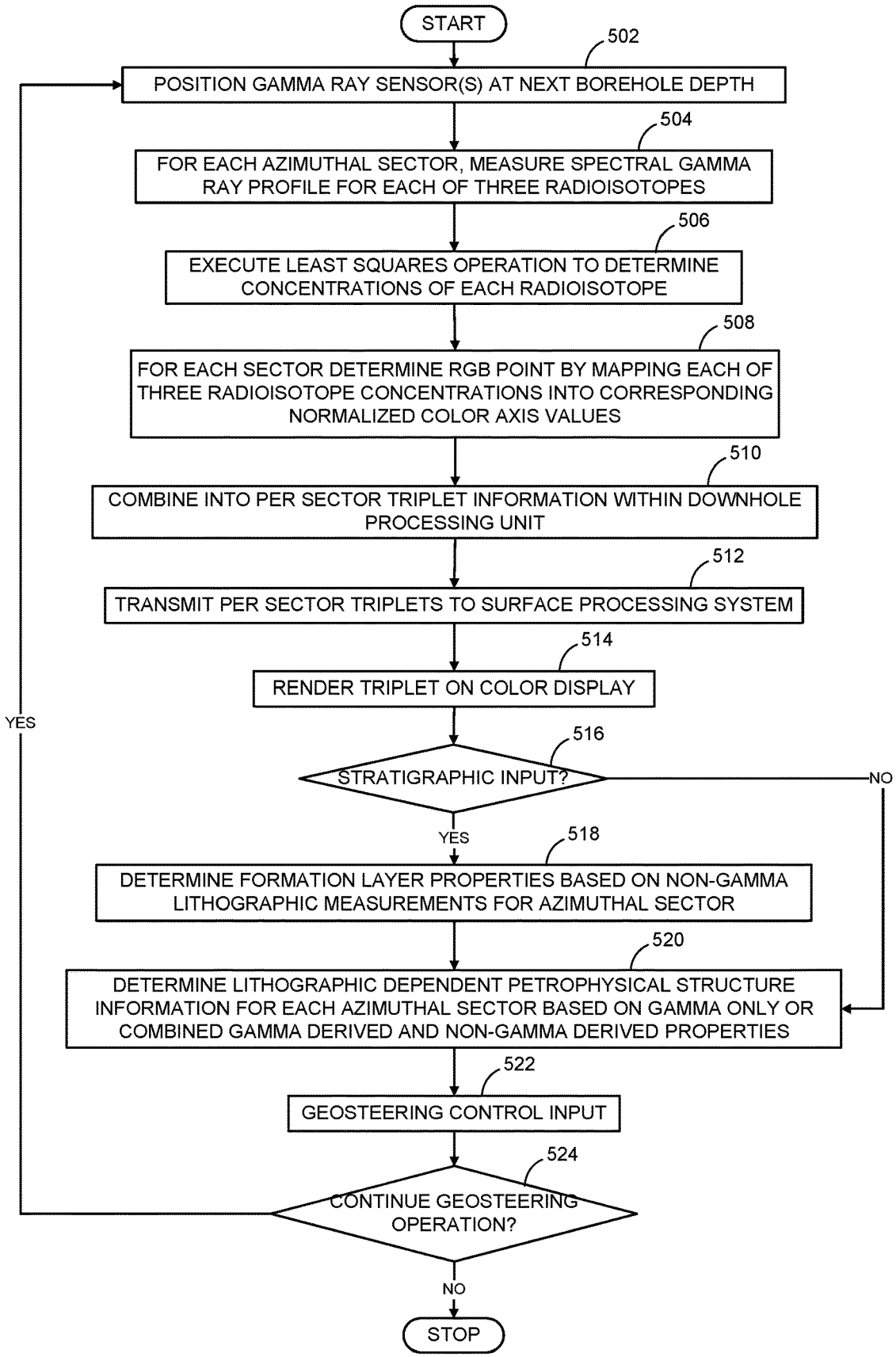
FIG. 5 is a flow diagram depicting operations and functions performed during LWD logging and geosteering operation cycles in accordance with some embodiments.

FIG. 5 is a flow diagram depicting operations and functions performed during LWD logging and geosteering operation cycles in accordance with some embodiments. The operations and function depicted and described with reference to FIG. 5 may be implemented by one or more of the systems and components described with reference to FIGS. 1-4. The process begin as shown at block 502 with well head components interacting with drill string or wireline components to position a gamma radiation logging tool at a measurement depth position within a borehole. The logging tool may be incorporated on a LWD drill string during LWD operations in which gamma radiation sensors within the logging tool are configured to measure gamma radiation at two or more azimuthal positions for each measurement depth. In addition to the logging tool being positioned and re-positioned within the borehole as the drill string advances, positioning of the logging tool may include azimuthally rotating the one or more gamma radiation sensors to enable full circumferential coverage of azimuthal positions. The circumferential coverage may comprise a circular or a spiral track within the borehole depending on whether the drill string is moving or is relatively motionless during gamma radiation measurements.

Following positioning or during continuous re-positioning of the logging tool, the gamma spectral profiles for each of three radioelements is determined (block 504). Spectral profiling begins with the gamma radiation sensors, such as may be scintillation sensors, measuring, detecting, or otherwise sensing gamma radiation at each of the measurement depths. For embodiments that utilize spectral gamma ray measurements, the gamma sensors measure gamma rays that match spectral patterns of each of three selected radioisotopes, such as thorium, uranium, and potassium. The gamma radiation measurements are performed in each of multiple azimuthally offset sectors/quadrants and the resultant measurement information includes gamma ray counts and energy level values recorded in association with the measurement depth and the corresponding azimuthal positions.

At block 506 a least squares fitting program component within the logging tool determines the respective concentrations of the three radioelements based, at least in part, on the spectral profiles of each of the radioelements. The radioelement concentrations data is received and processed by a three-dimensional color-coded display space coordinates mapper to generate three single-color scale values (block 508). For instance, an RGB coordinates mapper first normalizes the combination of three radioelement concentrations to enable mapping each of the concentration values, which may or may not be represented using a common unit, onto the scale of the three-dimensional color-coded space. The normalized concentration values are then mapped to respective scale positions that represent corresponding color intensity values on each of the three single-color axes.

At block 510, a triplet generator component within the logging tool receives and combines the three single-color, intensity encoded points into a triplet that effectively describes a single points within the three-dimensional color-coded space. At block 512, the logging tool transmits the generated triplets using a downhole telemetry link to a surface processing system such as depicted and described with reference to FIGS. 1A and 1B. Sets of triplets are collected and binned based on azimuthal measurement position and rendered on a color display device as illustrated at block 514. The sets of azimuthally binned triplets may be stream-processed by an azimuthal borehole imager such as depicted in FIG. 1B to generate a color-coded display of the respective concentrations of radioelements within each of the azimuthal sectors. In some embodiments, the surface processing system may further include a user input interface by which a user may enter steering information (e.g., geo-steering directions) based on the real-time borehole imaging data.

The displayed imaging data may be used alone or in conjunction with formation properties information determined based on non-gamma measurements. If at least one gamma-signature independent formation property is to also be used for steering (inquiry block 516), the process continues at block 518 with non-gamma lithographic measurements such as inductive logging used to determine formation resistivity/conductivity being determined and recorded. At block 520, the lithographic-dependent petrophysical structure information for each azimuthal sector is determined either based on the color-coded triplets alone or in combination with the non-gamma information (e.g., inductive logging resistivity data). Geosteering input is generated or otherwise provided as shown at block 522 and, if LWD operation continues, control returns to block 502.

Figure 6:
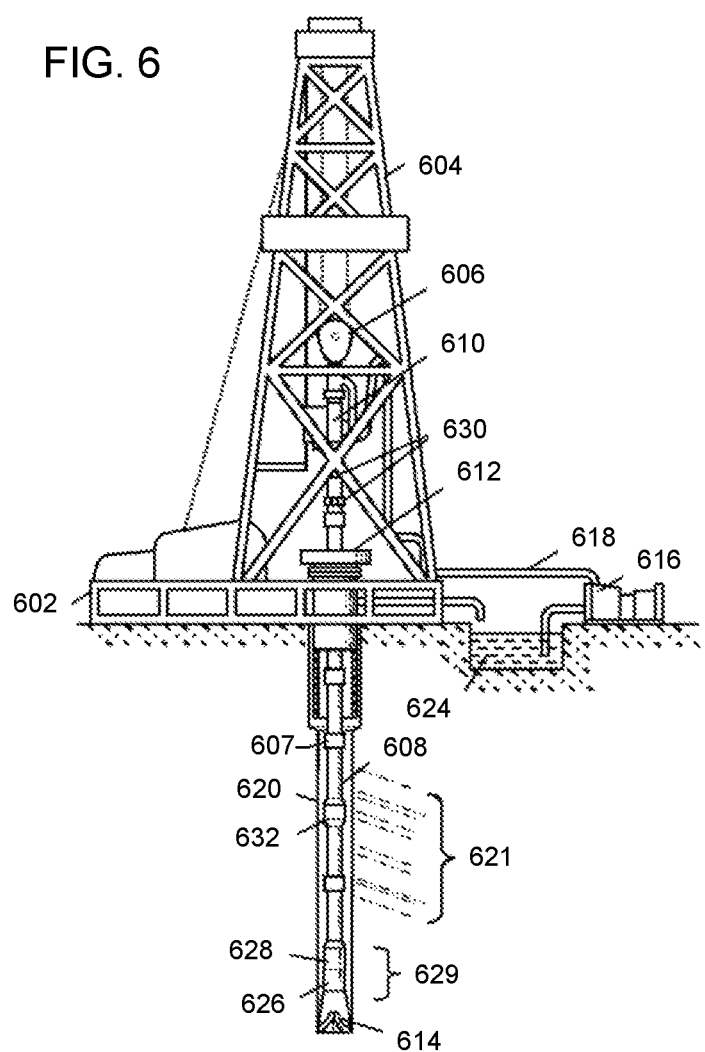
FIG. 6 illustrates an example LWD measurement system configured to provide formation properties information including azimuthal borehole imaging information in accordance with some embodiments.

FIG. 6 illustrates an example LWD measurement system configured to provide formation properties information including azimuthal borehole imaging information in accordance with some embodiments. In the illustrated LWD environment, a drilling platform 602 is equipped with a derrick 604 that supports a hoist 606 for raising and lowering a drill string 608. The hoist 606 suspends a top drive 610 that rotates the drill string 608 as it is lowered through the well head 612. The drill string 608 can be extended by temporarily anchoring the drill string 608 at the well head 612 and using the hoist 606 to position and attach new drill pipe sections with threaded connectors 607.

Connected to the lower end of the drill string 608 is a drill bit 614. As bit 614 rotates, it creates a borehole 620 that passes through various formations 621. A pump 616 circulates drilling fluid through a supply pipe 618 to top drive 610, through the interior of drill string 608, through orifices in drill bit 614, back to the surface via the annulus around drill string 608, and into a retention pit 624. The drilling fluid transports cuttings from the borehole 620 into the pit 624 and aids in maintaining the integrity of the borehole 620.

A gamma radiation logging tool 626 is integrated into a bottom-hole assembly 629 near the bit 614. As the bit extends the borehole 620 through the formations, the bottomhole assembly 629 collects gamma radiation measurements (using tool 626) as well as measurements of the tool orientation and position, and various other drilling conditions.

The position and orientation measurements collected by bottomhole assembly 629 may be obtained using an orientation indicator, which may include magnetometers, inclinometers, and/or accelerometers, though other sensor types such as gyroscopes may be used. Preferably, the orientation indicator includes a 3-axis fluxgate magnetometer and a 3-axis accelerometer.

The combination of those two sensor systems enables the measurement of the rotational ("toolface") angle, borehole inclination angle ("slope"), and compass direction ("azimuth"). In some embodiments, the toolface and borehole inclination angles are calculated from the accelerometer sensor output. The magnetometer sensor outputs are used to calculate the borehole azimuth. With the toolface, the borehole inclination, and the borehole azimuth information, multi-component induction logging tools disclosed herein can be used to steer the bit to the desirable bed.

In wells employing acoustic telemetry for LWD, downhole sensors (including gamma logging tool 626) are coupled to a telemetry module 628 having an acoustic telemetry transmitter that transmits telemetry signals in the form of acoustic vibrations in the tubing wall of drill string 608. An acoustic telemetry receiver array 630 may be coupled to tubing below the top drive 610 to receive transmitted telemetry signals. One or more repeater modules 632 may be optionally provided along the drill string to receive and retransmit the telemetry signals. Other telemetry techniques may be utilized including mud pulse telemetry, electromagnetic telemetry, and wired drill pipe telemetry. Many telemetry techniques also offer the ability to transfer commands from the surface to the bottomhole assembly 629, thereby enabling adjustment of the configuration and operating parameters of gamma radiation logging tool 626. In some embodiments, the telemetry module 628 also or alternatively stores measurements for later retrieval when the bottomhole assembly 629 returns to the surface.

Figure 7:
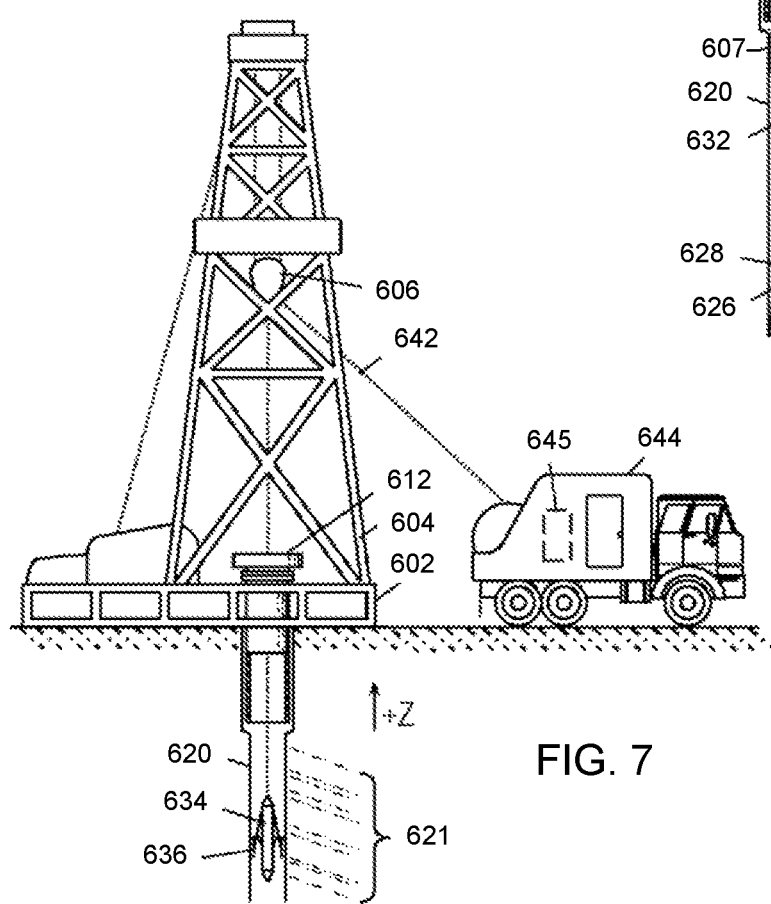
FIG. 7 depicts an example wireline (WL) measurement system configured to provide formation properties information to be used for generating borehole azimuthal images from gamma logging information in accordance with some embodiments.

At various times during the drilling process, the drill string 608 is removed from the borehole 620 as shown in FIG. 7. Once the drill string has been removed, logging operations can be conducted using a wireline gamma logging tool 634, i.e., a sensing instrument sonde suspended by a cable 642 having conductors for transporting power to the tool 634 and communications from the tool 634 to the surface. A gamma logging portion of the wireline logging tool 634 may have centralizing arms 636 that center the tool 634 within the borehole 620 as the tool 634 is pulled uphole. A logging facility 644 collects measurements from the gamma logging tool 634, and includes computing facilities 645 for processing and storing the measurements gathered by the wireline gamma logging tool 634.

Example Computer

Figure 8:
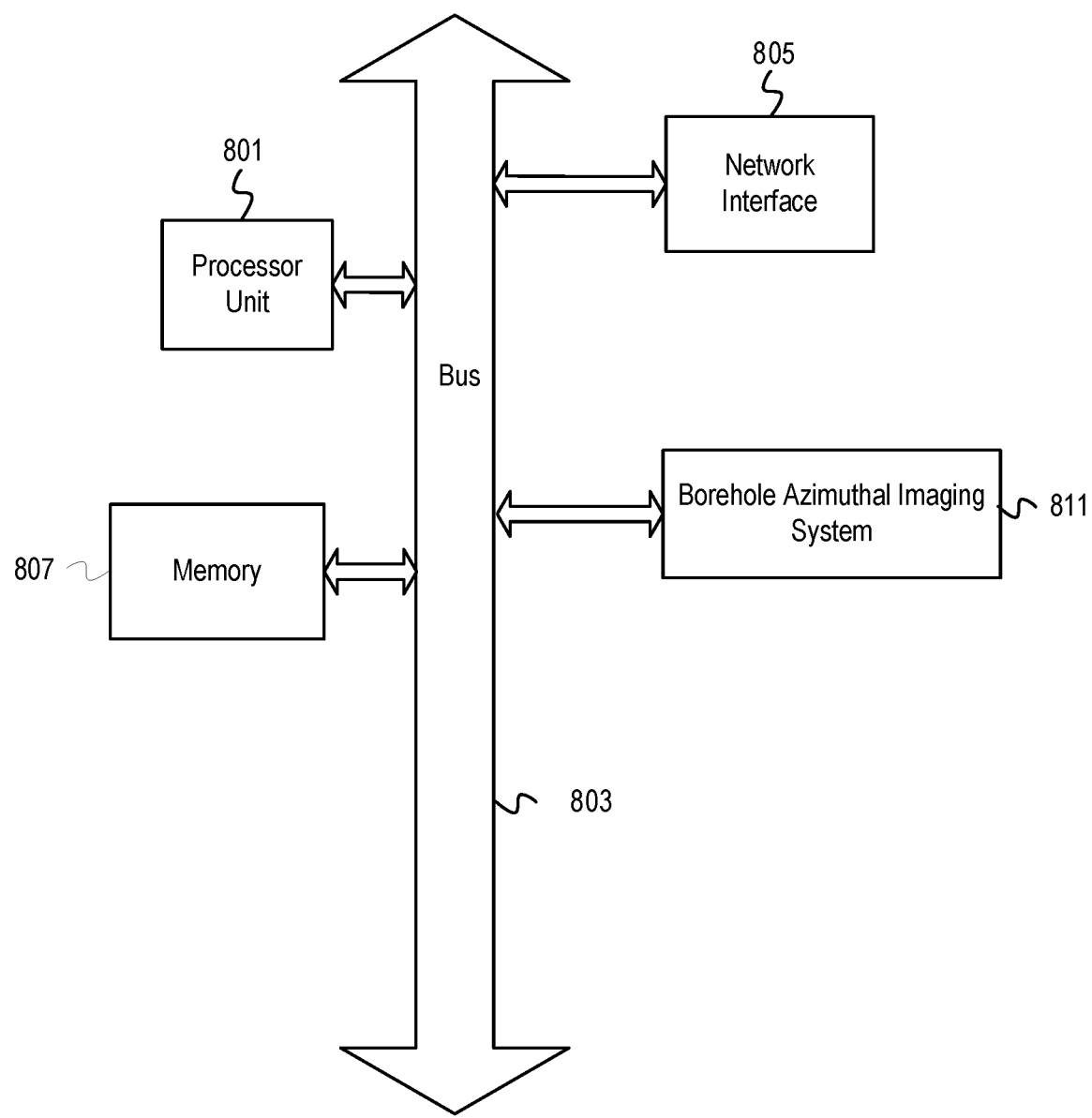
FIG. 8 is a block diagram depicting an example computer system that may be utilized to implement borehole imaging in accordance with some embodiments.

FIG. 8 depicts an example computer, according to some embodiments. The computer system includes a processor 801 (possibly including multiple processors, multiple cores, multiple nodes, and/or implementing multi-threading, etc.). The computer system includes a memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport® bus, InfiniBand® bus, NuBus, etc.) and a network interface 805 (e.g., a Fiber Channel interface, an Ethernet interface, an internet small computer system interface, SONET interface, wireless interface, etc.).

The system also includes a borehole azimuthal imaging system 811, which may be hardware, software, firmware, or a combination thereof. For example, the borehole azimuthal imaging system 811 may comprise instructions executable by the processor 801. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. The borehole azimuthal imaging system 811 generates realtime azimuthal imaging that includes three-dimensionally encoded radioelement concentration data in the manner described above. Additional realizations may include fewer or more components not expressly illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

Variations

While the aspects of the disclosure are described with reference to various implementations and exploitations, it will be understood that these aspects are illustrative and that the scope of the claims is not limited to them. In general, techniques for borehole imaging as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device. Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Use of the phrase "at least one of" preceding a list with the conjunction "and" should not be treated as an exclusive list and should not be construed as a list of categories with one item from each category, unless specifically stated otherwise.

EXAMPLE EMBODIMENTS

Example embodiments include the following:

Embodiment 1: A method comprising: disposing a logging tool having one or more gamma radiation sensors at a depth position within a borehole, including positioning the one or more gamma radiation sensors to measure gamma radiation within multiple azimuthally offset sectors; measuring, by the gamma radiation sensors, gamma radiation at one or more positions within each of the azimuthally offset sectors; determining a spectral gamma radiation profile for three radioelements at the one or more positions within each of the azimuthally offset sectors based on the gamma radiation measurements; determining concentrations of each of the radioelements at the one or more positions based, at least in part, on the spectral gamma radiation profiles; generating a plurality of color coded points that each encode the combined concentrations of one or more of the radioelements by mapping each of the determined concentrations to an axis point on each of three color coded axes that define a three dimensional display space; and rendering the color coded points in an azimuthal radioelement borehole image.

Embodiment 2: The method of Embodiment 1, wherein said generating a plurality of color coded points further includes, for each of the one or more positions within each sector, combining the three axis points to a single color coded point encoded as a triplet coordinate within the three dimensional display space.

Embodiment 3: The method of Embodiments 1-2, wherein said generating the plurality of color coded points comprises the logging tool generating the plurality of color coded points, said method further comprising the logging tool transmitting the color coded points to a display system that renders the color coded points.

Embodiment 4: The method of Embodiments 1-3, wherein the three radioelements comprise thorium, uranium, and potassium, said mapping each of the determined concentrations to an axis point on each of three color coded axes comprising mapping determined concentrations of thorium to an axis point on a green coded axis, mapping determined concentrations of uranium to an axis point on a blue coded axis, and mapping determined concentrations of potassium to an axis point on a red coded axis.

Embodiment 5: The method of Embodiments 1-4, further comprising determining drilling direction based, at least in part, on the azimuthal radioelement borehole image.

Embodiment 6: The method of Embodiments 1-5, further comprising: measuring a total gamma radiation response at the borehole depth position: generating an azimuthal lithographic borehole image based on the total gamma radiation response; and determining drilling direction based on a combination of the azimuthal structural borehole image and the azimuthal radioelement borehole image.

Embodiment 7: The method of Embodiments 1-6, wherein the logging tool includes a formation material structure detector, said method further comprising: measuring laminated layer properties at the borehole depth position using the material structure detector; and determining drilling direction based on a combination of the laminated layer properties and the azimuthal radioelement borehole image.

Embodiment 8: A system comprising: a logging tool having one or more gamma radiation sensors disposed at a depth position within a borehole, wherein the one or more gamma radiation sensors are configured to measure gamma radiation within multiple azimuthally offset sectors, wherein the logging tool further includes, a spectral analyzer configured to determining a spectral gamma radiation profile for three radioelements at the one or more positions within each of the azimuthally offset sectors based on the gamma radiation measurements; and a radioelement model configured to determine concentrations of each of the radioelements at the one or more positions based, at least in part, on the spectral gamma radiation profiles; a display coordinates mapper configured to generate a plurality of color coded points that each encode the combined concentrations of one or more of the radioelements by mapping each of the determined concentrations to an axis point on each of three color coded axes that define a three dimensional display space; and a data processing system that receives the color coded points transmitted by the logging tool, the data processing system configured to render the color coded points in an azimuthal radioelement borehole image.

Embodiment 9: The system of Embodiment 8, wherein said display coordinates mapper is further configured to, for each of the one or more positions within each sector, combine the three axis points to a single color coded point encoded as a triplet coordinate within the three dimensional display space.

Embodiment 10: The system of Embodiments 8-9, wherein said display coordinates mapper is incorporated in the logging tool, and wherein the logging tool is configured to transmit the color coded points to a display system that renders the color coded points.

Embodiment 11: The system of Embodiments 8-10, wherein the three radioelements comprise thorium, uranium, and potassium, said display coordinates mapper configured to, map determined concentrations of thorium to an axis point on a green coded axis; map determined concentrations of uranium to an axis point on a blue coded axis; and map determined concentrations of potassium to an axis point on a red coded axis.

Embodiment 12: The system of Embodiments 8-11, further comprising a steering control unit configured to determine drilling direction based, at least in part, on the azimuthal radioelement borehole image.

Embodiment 13: The system of Embodiments 8-12, said one or more gamma radiation sensors configured to measure a total gamma radiation response at the borehole depth position, said logging tool configured to generate an azimuthal lithographic borehole image based on the total gamma radiation response, and said steering control unit configured to determine drilling direction based on a combination of the azimuthal structural borehole image and the azimuthal radioelement borehole image.

Embodiment 14: The system of Embodiments 8-13, wherein said logging tool includes a formation material structure detector configured to measure laminated layer properties at the borehole depth position, and wherein said steering control unit is configured to determine drilling direction based on a combination of the laminated layer properties and the azimuthal radioelement borehole image.

Embodiment 15: An apparatus comprising: a logging tool having one or more gamma radiation sensors disposed at a depth position within a borehole, wherein the one or more gamma radiation sensors are configured to measure gamma radiation within multiple azimuthally offset sectors, wherein the logging tool further includes, a processor, and a machine-readable medium having program code executable by the processor to, measure, by the gamma radiation sensors, gamma radiation at one or more positions within each of the azimuthally offset sectors; determine a spectral gamma radiation profile for three radioelements at the one or more positions within each of the azimuthally offset sectors based on the gamma radiation measurements; determine concentrations of each of the radioelements at the one or more positions based, at least in part, on the spectral gamma radiation profiles; generate a plurality of color coded points that each encode the combined concentrations of one or more of the radioelements by mapping each of the determined concentrations to an axis point on each of three color coded axes that define a three dimensional display space; and a communication interface to transmit the color coded points to a data processing system; and machine-readable program code within the data processing system executable by a processor in the data processing system to render the color coded points in an azimuthal radioelement borehole image.

Embodiment 16: The apparatus of Embodiment 15, wherein said generating a plurality of color coded points further includes, for each of the one or more positions within each sector, combining the three axis points to a single color coded point encoded as a triplet coordinate within the three dimensional display space.

Embodiment 17: The apparatus of Embodiments 15-16, wherein said generating the plurality of color coded points comprises the logging tool generating the plurality of color coded points, and wherein the logging tool is configured to transmit the color coded points to a display system that renders the color coded points.

Embodiment 18: The apparatus of Embodiments 15-17, wherein the three radioelements comprise thorium, uranium, and potassium, said mapping each of the determined concentrations to an axis point on each of three color coded axes comprising mapping determined concentrations of thorium to an axis point on a green coded axis, mapping determined concentrations of uranium to an axis point on a blue coded axis, and mapping determined concentrations of potassium to an axis point on a red coded axis.

Embodiment 19: The apparatus of Embodiments 15-18, further comprising determining drilling direction based, at least in part, on the azimuthal radioelement borehole image.

Embodiment 20: The apparatus of Embodiments 15-19, wherein the logging tool includes a formation material structure detector configured to measure laminated layer properties at the borehole depth position using the material structure detector, and wherein the machine-readable medium in the logging tool includes program code executable by the processor to determine drilling direction based on a combination of the laminated layer properties and the azimuthal radioelement borehole image.

What is claimed is:

1. A method for imaging a borehole, said method comprising:
    disposing a logging tool having one or more gamma radiation sensors at a depth position within a borehole, including positioning the one or more gamma radiation sensors to measure gamma radiation within multiple azimuthally offset sectors;
    measuring, by the gamma radiation sensors, gamma radiation at one or more positions within each of the azimuthally offset sectors;
    determining a spectral gamma radiation profile for three radioelements at the one or more positions within each of the azimuthally offset sectors based on the gamma radiation measurements;
    determining concentrations of each of the radioelements at the one or more positions based, at least in part, on the spectral gamma radiation profiles;
    generating a plurality of color coded points that each encode the combined concentrations of one or more of the radioelements by mapping each of the determined concentrations to an axis point on each of three color coded axes that define a three dimensional display space; and
    rendering the color coded points in an azimuthal radioelement borehole image.

2. The method of claim 1, wherein said generating a plurality of color coded points further includes, for each of the one or more positions within each sector, combining the three axis points to a single color coded point encoded as a triplet coordinate within the three dimensional display space.

3. The method of claim 2, wherein said generating the plurality of color coded points comprises the logging tool generating the plurality of color coded points, said method further comprising the logging tool transmitting the color coded points to a display system that renders the color coded points.

4. The method claim 1, wherein the three radioelements comprise thorium, uranium, and potassium, said mapping each of the determined concentrations to an axis point on each of three color coded axes comprising mapping determined concentrations of thorium to an axis point on a green coded axis, mapping determined concentrations of uranium to an axis point on a blue coded axis, and mapping determined concentrations of potassium to an axis point on a red coded axis.

5. The method of claim 1, further comprising determining drilling direction based, at least in part, on the azimuthal radioelement borehole image.

6. The method of claim 5, further comprising:
    measuring a total gamma radiation response at the borehole depth position;
    generating an azimuthal lithographic borehole image based on the total gamma radiation response; and
    determining drilling direction based on a combination of the azimuthal structural borehole image and the azimuthal radioelement borehole image.

7. The method of claim 5, wherein the logging tool includes a formation material structure detector, said method further comprising:
    measuring laminated layer properties at the borehole depth position using the material structure detector; and
    determining drilling direction based on a combination of the laminated layer properties and the azimuthal radioelement borehole image.

8. A system for imaging a borehole, said system comprising:
- a logging tool having one or more gamma radiation sensors disposed at a depth position within a borehole, wherein the one or more gamma radiation sensors are configured to measure gamma radiation within multiple azimuthally offset sectors, wherein the logging tool further includes,
  - a spectral analyzer configured to determining a spectral gamma radiation profile for three radioelements at the one or more positions within each of the azimuthally offset sectors based on the gamma radiation measurements; and
  - a radioelement model configured to determine concentrations of each of the radioelements at the one or more positions based, at least in part, on the spectral gamma radiation profiles;
  - a display coordinates mapper configured to generate a plurality of color coded points that each encode the combined concentrations of one or more of the radioelements by mapping each of the determined concentrations to an axis point on each of three color coded axes that define a three dimensional display space; and
- a data processing system that receives the color coded points transmitted by the logging tool, the data processing system configured to render the color coded points in an azimuthal radioelement borehole image.

9. The system of claim 8, wherein said display coordinates mapper is further configured to, for each of the one or more positions within each sector, combine the three axis points to a single color coded point encoded as a triplet coordinate within the three dimensional display space.

10. The system of claim 9, wherein said display coordinates mapper is incorporated in the logging tool, and wherein the logging tool is configured to transmit the color coded points to a display system that renders the color coded points.

11. The system claim 8, wherein the three radioelements comprise thorium, uranium, and potassium, said display coordinates mapper configured to,
  map determined concentrations of thorium to an axis point on a green coded axis;
  map determined concentrations of uranium to an axis point on a blue coded axis; and
  map determined concentrations of potassium to an axis point on a red coded axis.

12. The system of claim 8, further comprising a steering control unit configured to determine drilling direction based, at least in part, on the azimuthal radioelement borehole image.

13. The system of claim 12, said one or more gamma radiation sensors configured to measure a total gamma radiation response at the borehole depth position, said logging tool configured to generate an azimuthal lithographic borehole image based on the total gamma radiation response, and said steering control unit configured to determine drilling direction based on a combination of the azimuthal structural borehole image and the azimuthal radioelement borehole image.

14. The system of claim 12, wherein said logging tool includes a formation material structure detector configured to measure laminated layer properties at the borehole depth position, and wherein said steering control unit is configured to determine drilling direction based on a combination of the laminated layer properties and the azimuthal radioelement borehole image.

15. An apparatus for imaging a borehole, said apparatus comprising:
- a logging tool having one or more gamma radiation sensors disposed at a depth position within a borehole, wherein the one or more gamma radiation sensors are configured to measure gamma radiation within multiple azimuthally offset sectors, wherein the logging tool further includes,
  - a processor; and
  - a machine-readable medium having program code executable by the processor to,
    - measure, by the gamma radiation sensors, gamma radiation at one or more positions within each of the azimuthally offset sectors;
    - determine a spectral gamma radiation profile for three radioelements at the one or more positions within each of the azimuthally offset sectors based on the gamma radiation measurements;
    - determine concentrations of each of the radioelements at the one or more positions based, at least in part, on the spectral gamma radiation profiles;
    - generate a plurality of color coded points that each encode the combined concentrations of one or more of the radioelements by mapping each of the determined concentrations to an axis point on each of three color coded axes that define a three dimensional display space; and
  - a communication interface to transmit the color coded points to a data processing system; and
- machine-readable program code within the data processing system executable by a processor in the data processing system to render the color coded points in an azimuthal radioelement borehole image.

16. The apparatus of claim 15, wherein said generating a plurality of color coded points further includes, for each of the one or more positions within each sector, combining the three axis points to a single color coded point encoded as a triplet coordinate within the three dimensional display space.

17. The apparatus of claim 16, wherein said generating the plurality of color coded points comprises the logging tool generating the plurality of color coded points, and wherein the logging tool is configured to transmit the color coded points to a display system that renders the color coded points.

18. The apparatus claim 15, wherein the three radioelements comprise thorium, uranium, and potassium, said mapping each of the determined concentrations to an axis point on each of three color coded axes comprising mapping determined concentrations of thorium to an axis point on a green coded axis, mapping determined concentrations of uranium to an axis point on a blue coded axis, and mapping determined concentrations of potassium to an axis point on a red coded axis.

19. The apparatus of claim 15, further comprising determining drilling direction based, at least in part, on the azimuthal radioelement borehole image.

20. The apparatus of claim 19, wherein the logging tool includes a formation material structure detector configured to measure laminated layer properties at the borehole depth position using the material structure detector, and wherein the machine-readable medium in the logging tool includes program code executable by the processor to determine drilling direction based on a combination of the laminated layer properties and the azimuthal radioelement borehole image.

* * * * *